(12) United States Patent
Huang et al.

(10) Patent No.: US 8,812,432 B2
(45) Date of Patent: Aug. 19, 2014

(54) LARGE-SCALE DATA PROCESSING APPARATUS, METHOD, AND NON-TRANSITORY TANGIBLE MACHINE-READABLE MEDIUM THEREOF

(71) Applicant: eBizprise Inc., Taipei (TW)

(72) Inventors: Yi-Cheng Huang, Taipei (TW); Wenwey Hseush, Taipei (TW); Michael Chih Huong Fong, Taipei (TW); Yu-Chun Lai, Taipei (TW)

(73) Assignee: eBizprise Inc., Taipei (TW)

( * ) Notice: Subject to any disclaimer, the term of this patent is extended or adjusted under 35 U.S.C. 154(b) by 134 days.

(21) Appl. No.: 13/666,732

(22) Filed: Nov. 1, 2012

(65) Prior Publication Data

US 2014/0122478 A1    May 1, 2014

(51) Int. Cl.
*G06F 17/30* (2006.01)

(52) U.S. Cl.
CPC .... *G06F 17/30011* (2013.01); *G06F 17/30073* (2013.01); *G06F 17/30088* (2013.01)
USPC ............................ 707/600; 707/601; 707/607

(58) Field of Classification Search
CPC ................... G06F 17/30011; G06F 17/30073; G06F 17/30088
USPC .......... 707/600–601, 607, 201, 203, 213, 217
See application file for complete search history.

(56) References Cited

U.S. PATENT DOCUMENTS

| | | | | |
|---|---|---|---|---|
| 5,675,784 | A * | 10/1997 | Maxwell et al. | 1/1 |
| 7,720,803 | B2 * | 5/2010 | Unnebrink et al. | 707/601 |
| 8,527,327 | B1 * | 9/2013 | Lawrence | 705/7.38 |
| 8,655,918 | B2 * | 2/2014 | Chitnis et al. | 707/796 |
| 2007/0130116 | A1 * | 6/2007 | Cras et al. | 707/2 |
| 2007/0203933 | A1 * | 8/2007 | Iversen et al. | 707/102 |
| 2014/0086069 | A1 * | 3/2014 | Frey et al. | 370/252 |

* cited by examiner

*Primary Examiner* — Frantz Coby
(74) *Attorney, Agent, or Firm* — Tim Tingkang Xia, Esq.; Morris, Manning & Martin, LLP (57) ABSTRACT

A large-scale data processing apparatus, method, and non-transitory tangible machine-readable medium are provided. The large-scale data processing apparatus includes a storage unit, an interface, and a processor. The storage unit is stored with a measure table comprising at least one measure. Each of the at least one measure includes a value corresponding to a key attribute and a piece of data corresponding to a data field. The interface is configured to receive a level order of N attributes, wherein N is a positive integer and the N attributes comprise the key attribute. The processor is configured to create a measure tree object for the measure table by following the level order so that the measure tree object has N levels corresponding to the N attributes in a one-to-one fashion.

19 Claims, 11 Drawing Sheets

| channel.store | channel.city | channel.area |
|---|---|---|
| store 1 | Taipei | north |
| store 2 | Taipei | north |
| store 3 | Kaoshung | south |
| store 4 | Taichung | middle |

FIG. 4A

| product.sku | product.category | product.subcategory |
|---|---|---|
| product 1 | food | beverage |
| product 2 | food | bakery |
| product 3 | book | fiction |
| product 4 | book | non-fiction |

FIG. 4B

| product.sku | channel.store | week 1 | week 2 |
|---|---|---|---|
| product 3 | store 1 | 10 | 10 |
| product 4 | store 4 | 5 | 8 |
| product 2 | store 1 | 120 | 140 |
| product 1 | store 3 | 320 | 280 |
| product 1 | store 4 | 200 | 250 |
| product 4 | store 2 | 10 | 12 |
| product 3 | store 2 | 12 | 5 |
| product 2 | store 2 | 110 | 150 |

| product.sku | product. subcategory | channel.store | channel.city | week 1 | week 2 |
|---|---|---|---|---|---|
| product 3 | fiction | store 1 | Taipei | 10 | 10 |
| product 4 | non-fiction | store 4 | Taichung | 5 | 8 |
| product 2 | bakery | store 1 | Taipei | 120 | 140 |
| product 1 | beverage | store 3 | Kaoshung | 320 | 280 |
| product 1 | beverage | store 4 | Taichung | 200 | 250 |
| product 4 | non-fiction | store 2 | Taipei | 10 | 12 |
| product 3 | fiction | store 2 | Taipei | 12 | 5 |
| product 2 | bakery | store 2 | Taipei | 110 | 150 |

| channel.city | channel.store | product.subcategory | product.sku | week 1 | week 2 |
|---|---|---|---|---|---|
| Kaoshung | store 3 | beverage | product 1 | 320 | 280 |
| Taichung | store 4 | beverage | product 1 | 200 | 250 |
| Taichung | store 4 | non-fiction | product 4 | 5 | 8 |
| Taipei | store 1 | bakery | product 2 | 120 | 140 |
| Taipei | store 1 | fiction | product 3 | 10 | 10 |
| Taipei | store 2 | bakery | product 2 | 110 | 150 |
| Taipei | store 2 | fiction | product 3 | 12 | 5 |
| Taipei | store 2 | non-fiction | product 4 | 10 | 12 |

LARGE-SCALE DATA PROCESSING APPARATUS, METHOD, AND NON-TRANSITORY TANGIBLE MACHINE-READABLE MEDIUM THEREOF

CROSS-REFERENCES TO RELATED APPLICATIONS

Not applicable.

BACKGROUND OF THE INVENTION

1. Field of the Invention

The present invention relates to data processing system, method, and non-transitory tangible machine-readable medium thereof more particularly, the present invention relates to large-scale data processing system, method, and non-transitory tangible machine-readable medium thereof.

2. Descriptions of the Related Art

With the rapid development in computer technologies, most enterprises collect, store, manipulate, and organize business information/data in computers in a systematic way. Relational databases and on-line analytical processing (OLAP) are examples of commonly adopted technologies.

Although various commercial products of relational databases and OLAP have been developed, they have shortcomings when the amount of business data being stored becomes huge. There are occasions that a business manager would like to make a real-time decision based on an analytical result of processing a huge amount of data stored in a database. However, databases on the market today cannot provide a real-time response when the amount of data being processed is huge. Accessing and analyzing millions or billions records usually take significant amount of time. For business managers that have to perform analysis and make real-time decisions based on big data, the long-processing time of the databases on the market today is intolerable.

According to the above description, an apparatus and method that can process big/huge/large data efficiently is in an urgent need.

SUMMARY OF THE INVENTION

To solve the aforesaid problem, the present invention provides a large-scale data processing apparatus, a large-scale data processing method, and a non-transitory tangible machine-readable medium thereof.

The large-scale data processing apparatus of the present invention comprises a storage unit, an interface, and a processor, wherein the processor is electrically connected to the storage unit and the interface. The storage unit is stored with a measure table comprising at least one measure, wherein each of the at least one measure comprises a value corresponding to a key attribute and a piece of data corresponding to a data field. The interface is configured to receive a level order of N attributes, wherein N is a positive integer and the N attributes comprise the key attribute. The processor is configured to create a measure tree object for the measure table by following the level order so that the measure tree object has N levels corresponding to the N attributes in a one-to-one fashion.

The large-scale data processing method of the present invention is for use in an electronic apparatus. The large-scale data processing method comprises the following steps of: (a) accessing a measure table stored in a storage unit, wherein the measure table comprises at least one measure, each of the at least one measure comprises a value corresponding to a key attribute and a piece of data corresponding to a data field, (b) receiving a level order of N attributes, wherein N is a positive integer and the N attributes comprise the key attribute, and (c) creating a measure tree object for the measure table by following the level order so that the measure tree object has N levels corresponding to the N attributes in a one-to-one fashion.

The non-transitory tangible machine-readable medium is stored with a computer program comprising a plurality of codes. The codes are able to execute a large-scale data processing method when the computer program is loaded into an electronic apparatus. The codes comprises code A, code B, and code C. Code A is for accessing a measure table stored in a storage unit, wherein the measure table comprises at least one measure and each of the at least one measure comprises a value corresponding to a key attribute and a piece of data corresponding to a data field. Code B is for receiving a level order of N attributes, wherein N is a positive integer and the N attributes comprise the key attribute. Code C is for creating a measure tree object for the measure table by following the level order so that the measure tree object has N levels corresponding to the N attributes in a one-to-one fashion.

The measure table of the present invention is defined with only at least one key attribute in addition to the data fields. When the user intends to operate the measure table from the viewpoint of N attributes, a level order of N attributes is inputted and the measure table may be extended by the TransJoin operation. Thereafter, the present invention creates a measure tree object for the measure table by following the level order so that the measure tree object has N levels corresponding to the N attributes in a one-to-one fashion. In this way, the information can be easily queried and retrieved via a view path.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the large-scale data processing apparatus, method, and non-transitory tangible machine-readable medium thereof of the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1:
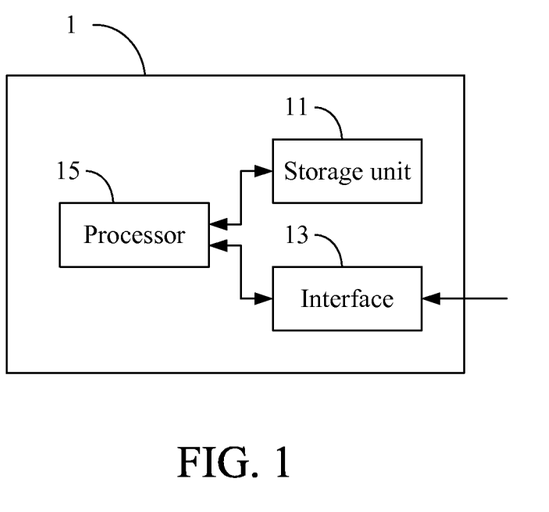
FIG. 1 illustrates a schematic view of a large-scale data processing apparatus 1 of the present invention.

FIG. 1 illustrates a schematic view of a large-scale data processing apparatus 1 of the present invention. The large-scale data processing apparatus 1 comprises a storage unit 11, an interface 13, and a processor 15. The storage unit 11 may be a memory, a floppy disk, a hard disk, a compact disk (CD), a mobile disk, a magnetic tape, a database accessible to networks, or any other storage media with the same function and well-known to those of ordinary skill in the art or a circuit. The user interface 13 may be any interface that can be controlled by a user and receive an instruction according to the control of the user. The processor 15 may be any of various processors, central processing units (CPUs), microprocessors, or other computing devices well known to those of ordinary skill in the art. The following embodiments will be described with reference to the large-scale data processing apparatus 1.

Figure 2A:
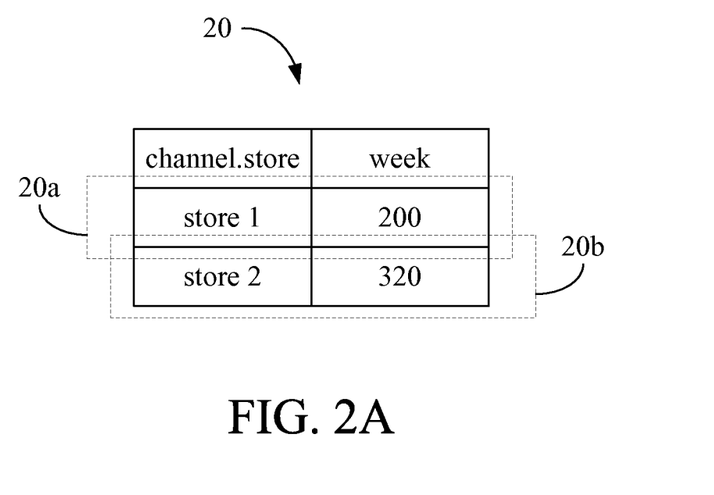
FIG. 2A illustrates a measure table of the first embodiment.
Figure 2B:
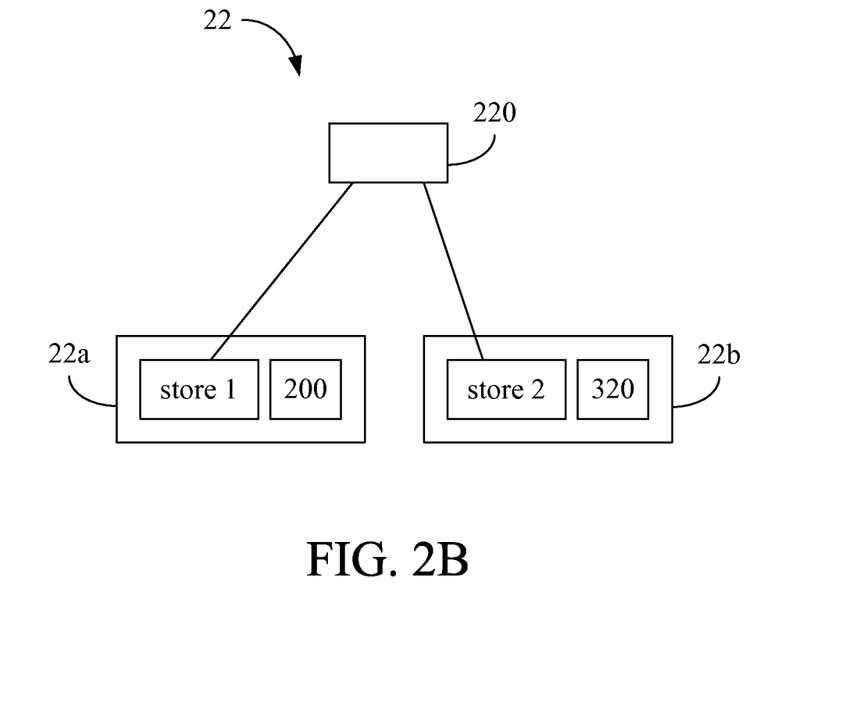
FIG. 2B illustrates a measure tree object of the first embodiment.

Please refer to FIGS. 2A and 2B for the first embodiment of the present invention. Particularly, FIG. 2A illustrates a measure table 20, while FIG. 2B illustrates a measure tree object 22 generated from the measure table 20.

The storage unit 11 is stored with the measure table 20 comprising two measures 20a, 20b. The measure table 20 is defined with a key attribute (i.e. "channel.store") and a data field (i.e. "week"). The measure 20a comprises a value (i.e. "store 1") corresponding to the key attribute and a piece of data (i.e. "200") corresponding to the data field. Likewise, the measure 20b comprises a value (i.e. "store 2") corresponding to the key attribute and a piece of data (i.e. "320") corresponding to the data field.

A user of the large-scale data processing apparatus 1 may input a level order of N attributes at the interface 13. It is noted that N is a positive integer, the N attributes comprise the key attribute (i.e. "channel.store"), and the contents of the N attributes is dependent to the requirement of the user. After the interface 13 receives the level order of N attributes, the processor 15 will create a measure tree object for the measure table 20 by following the level order so that the measure tree object has N levels corresponding to the N attributes in a one-to-one fashion.

In the first embodiment, the level order of N attributes inputted by the user comprises "channel.store," which means N is one. After the interface 13 receives the level order of N attributes, the processor 15 creates the measure tree object 22 in a way that the measure tree object 22 has one level corresponding to the level order of one attribute. Specifically, the node 220 is the root of the measure tree object 22 and has two child nodes 22a and 22b respectively corresponding to the value (i.e. "store 1") of measure 20a and the value (i.e. "store 2") of measure 20b. Moreover, the child node 22a has the piece of data (i.e. "200") of the measure 20a, while the child node 22b has the piece of data (i.e. "200") of the measure 20a.

After the measure tree object 22 has been created, the data originally stored in the measure table 20 can be easily queried via a view path, such as "/*."

Figure 3A:
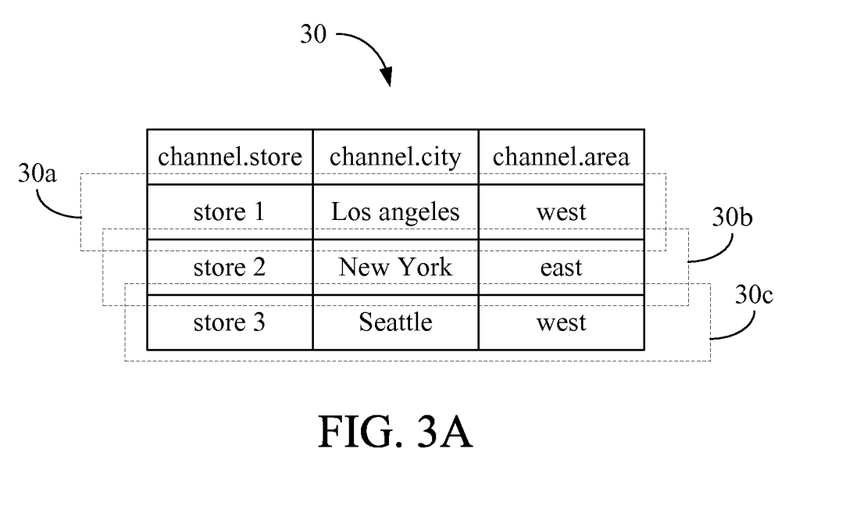
FIG. 3A illustrates a dimension table of the second embodiment.
Figure 3B:
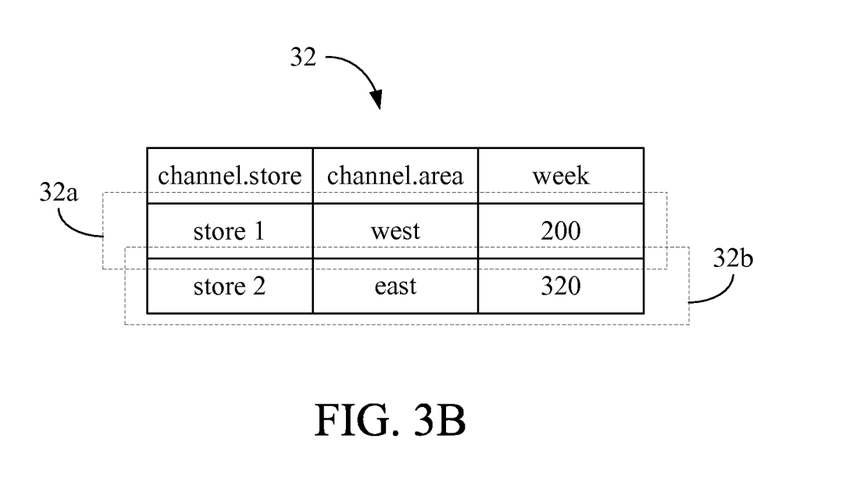
FIG. 3B illustrates an extended measure table of the second embodiment.
Figure 3C:
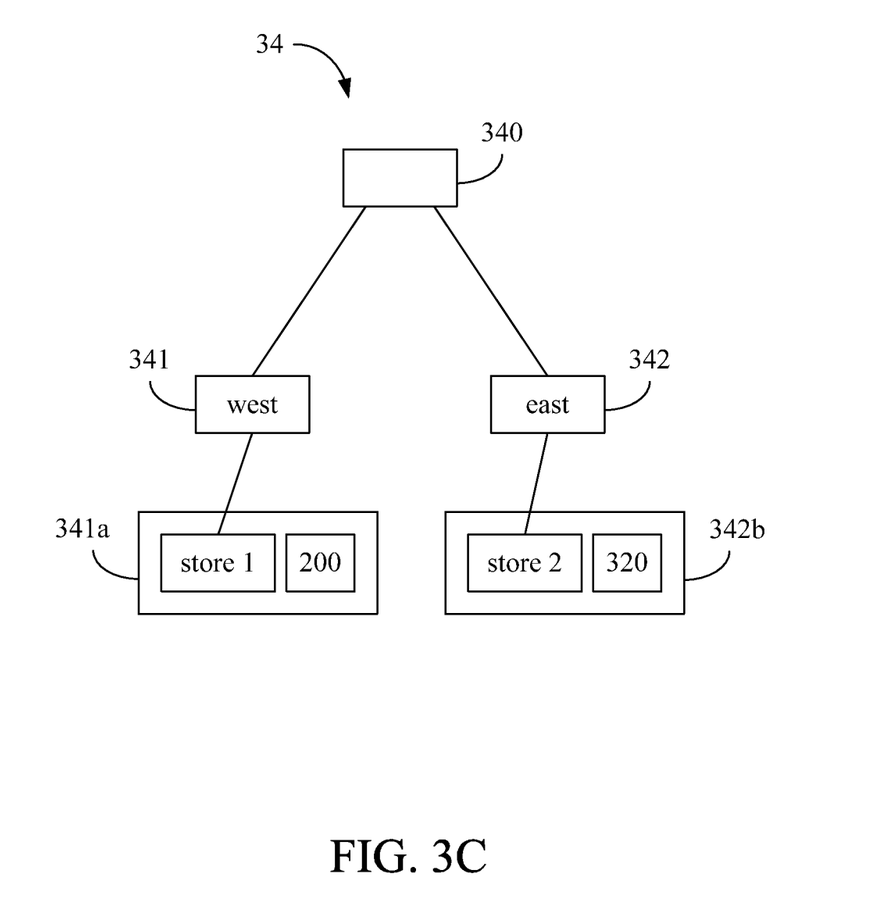
FIG. 3C illustrates a measure tree object of the second embodiment.

Please refer to FIGS. 2A, 3A, 3B, and 3C for the second embodiment of the present invention. Particularly, FIG. 3A illustrates a dimension table 30, FIG. 3B illustrates an extended measure table 32, and FIG. 3C illustrates a measure tree object 34.

In the second embodiment, the storage unit 11 is stored with the dimension table 30 for the "channel" dimension as well as the measure table 20. The dimension table 30 is defined with the key attribute (i.e. "channel.store") and two descriptive attributes (i.e. "channel.city" and "channel.area"). The dimension table 30 comprises three members 30a, 30b, and 30c. Each of the members 30a, 30b, and 30c comprises a key value corresponding to the key attribute (i.e. "channel.store"), a descriptive value corresponding to the descriptive attribute "channel.city," and another descriptive value corresponding to the descriptive attribute "channel.area." For example, the member 30a comprises the key value "store 1" corresponding to the key attribute "channel.store," the descriptive value "Los Angeles" corresponding to the descriptive attribute "channel.city," and another descriptive value "west" corresponding to the descriptive attribute "channel.area."

By comparing the measure table 20 and the dimension table 30, it can be learned that each value corresponding to the key attribute (i.e. "channel.store") of the measure table 20 is equivalent to one of the key values of the dimension table 30. For example, the value "store 1" of the measure 20a is equivalent to the key value "store 1" of the dimension table 30.

The user has the knowledge of both the measure table 20 and the dimension table 30; hence, the level order of N attributes inputted by the user may comprise the attributes from both the measure table 20 and the dimension table 30. In the following descriptions of this embodiment, it is assumed that the level order of N attributes inputted by the user comprises "channel.store" and "channel.area" and the level order of them begins from "channel.store" and ends at "channel.area."

After the interface 13 receives the level order of the two attributes, the processor 15 determines that the measure table 20 is not defined with the descriptive attribute "channel.area." Therefore, the processor 15 extends the measure table 20 into an extended measure table 32 having two measures 32a and 32b as shown in FIG. 3B by a TransJoin operation. To be more specific, the TransJoin operation joins the measure table 20 and the dimension table 30 with reference to the level order. In this way, each of the measures 32a and 32b of the extended measure table 32 comprises another value corresponding to the descriptive attribute "channel.area" after the TransJoin operation completes.

By comparing the extended measure table 32 and the dimension table 30, it can be learned that each value being extended into the extended measure table 32 is equivalent to one of the descriptive values corresponding to the descriptive attribute "channel.area." For example, the value "west" of the measure 32a is equivalent to the descriptive value "west" of the dimension table 30.

Thereafter, the processor 15 creates the measure tree object 34 as shown in FIG. 3C for the extended measure table 32 by following the level order (i.e. beginning from "channel.area" and ending at "channel.store") so that the measure tree object 34 has two levels corresponding to the two attributes of the level order in a one-to-one fashion. Since the measure tree object 34 is created based on the level order, it can be seen that the $0^{th}$ level of the measure tree object 34 is the root, the first level of the measure tree object 34 corresponds to the key attribute "channel.area", and the second level of the measure tree object 34 corresponds to the descriptive attribute "channel.store." Moreover, the node 340 is the root of the measure tree object 34 and has two children—nodes 341 and 342 respectively corresponding to the value "west" of the measure 32a and the value "east" of the measure 32b. In addition, the node 341 has one child—node 341a corresponding to the value "store 1" and has the piece of data (i.e. "200), while the child node 342 has one child—node 342a corresponding to the value "store 2" and has the piece of data (i.e. "320"). Similarly, after the measure tree object 34 has been created, the data originally stored in the measure table 20 can be easily queried via a view path, such as "/west/store 1."

It is emphasized that the measure table 20 is defined with only the key attribute (i.e. "channel.store") in addition to the data field (i.e. "week"). The key attribute of the measure table 20 corresponds to the key of the dimension table 30; hence, the measure table 20 can be stored in a compact manner (i.e. without storing values corresponding to other descriptive attributes). Values related to other descriptive attributes are derived by extending the measure table 20 based on the TransJoin operation only when there is a need.

Figure 4A:
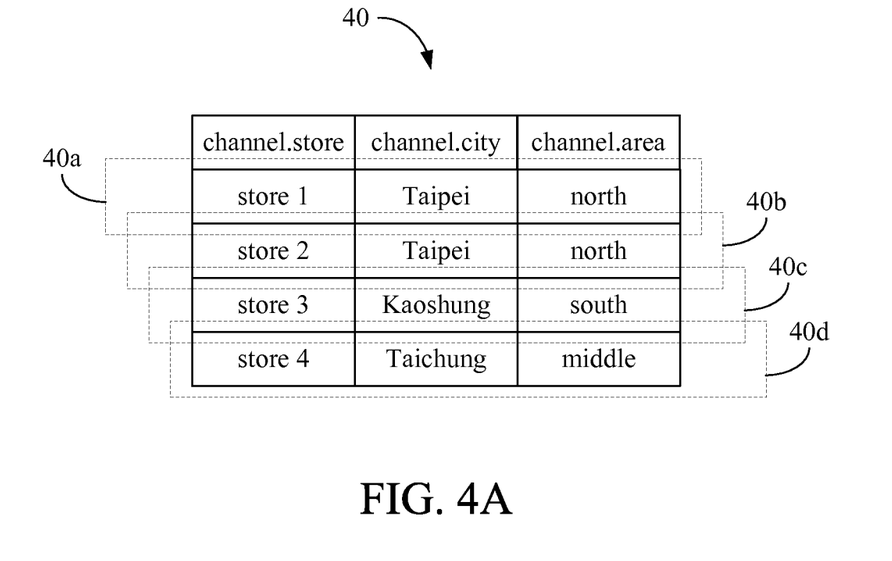
FIG. 4A illustrates a dimension table for the dimension "channel" of the third embodiment.
Figure 4B:
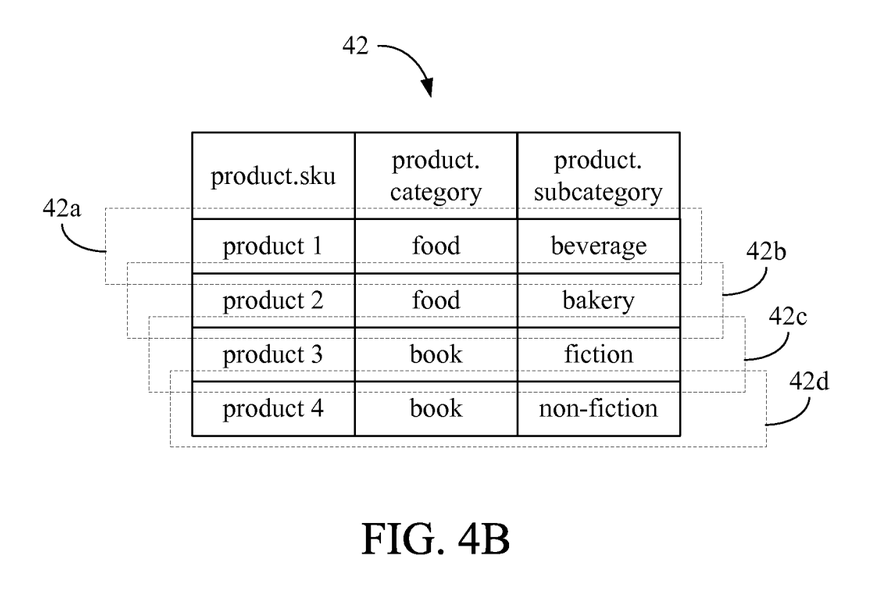
FIG. 4B illustrates a dimension table for the dimension "product" of the third embodiment.
Figure 4C:
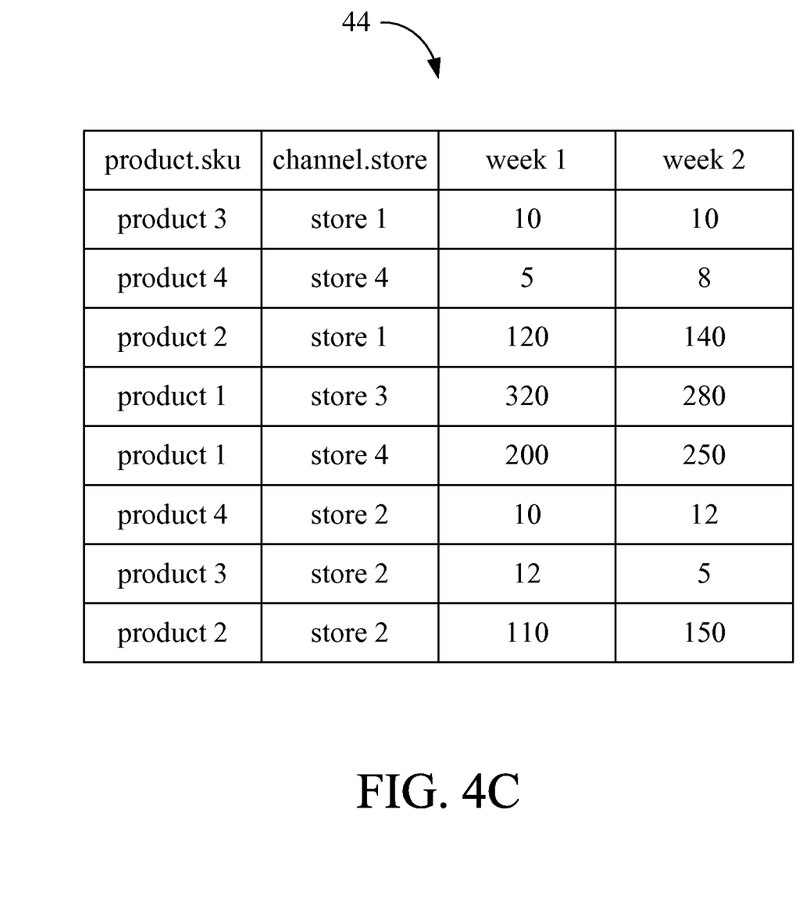
FIG. 4C illustrates a measure table of the third embodiment.
Figure 4D:
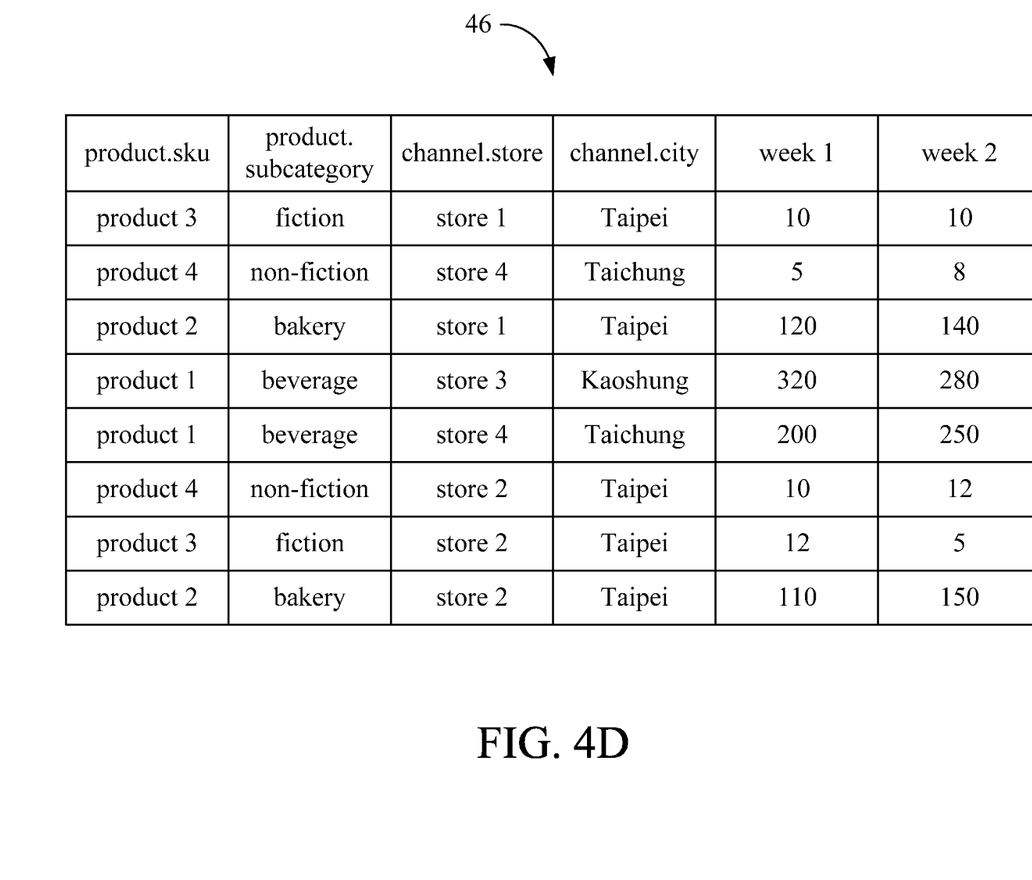
FIG. 4D illustrates an extended measure table of the third embodiment.
Figure 4E:
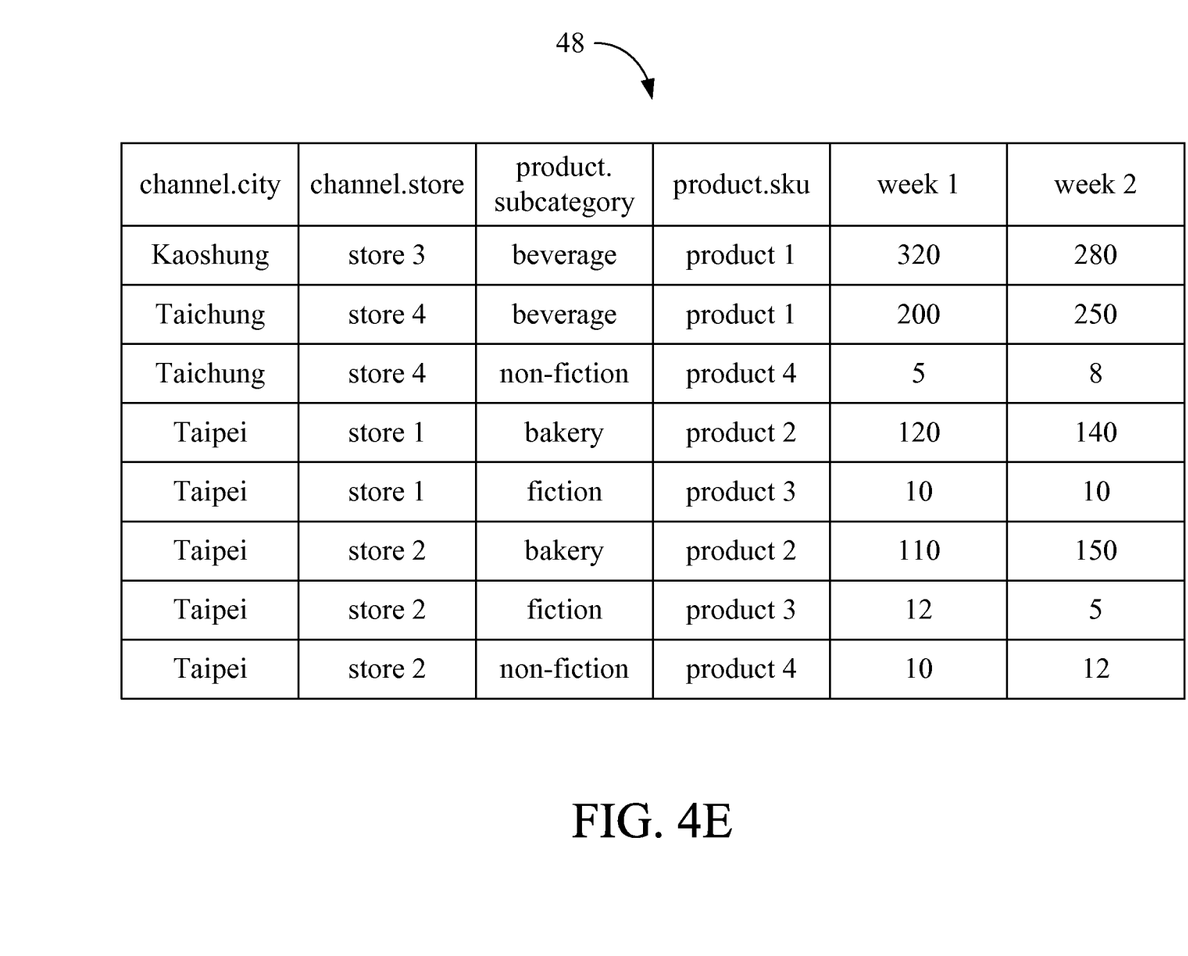
FIG. 4E illustrates a sorted and extended measure table of the third embodiment.
Figure 4F:
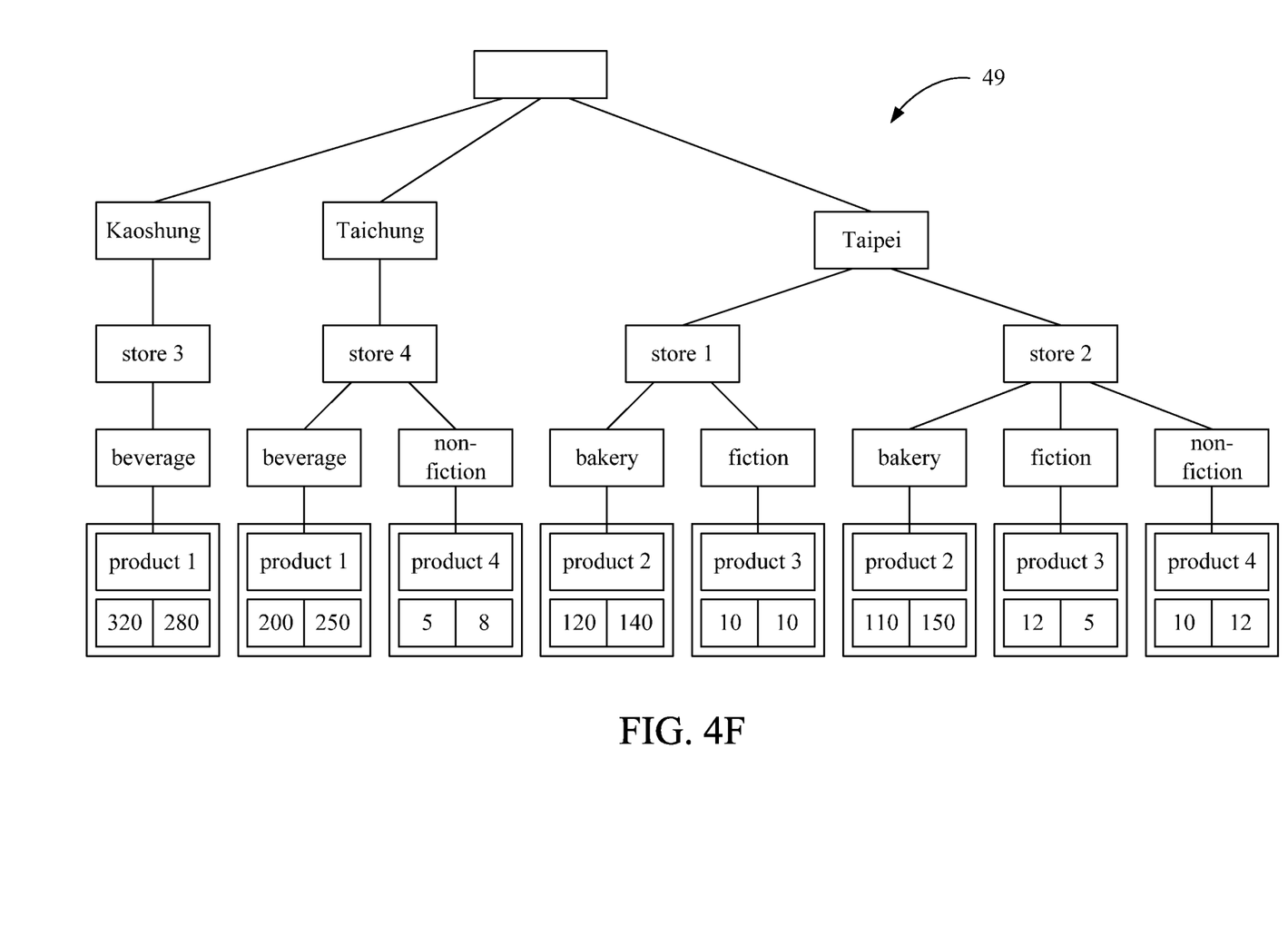
FIG. 4F illustrates a measure tree object of the third embodiment.

Please refer to FIGS. 4A, 4B, 4C, 4D, 4E, and 4F for the third embodiment of the present invention. Particularly, FIG. 4A illustrates a dimension table 40 for the dimension "channel," FIG. 4B illustrates a dimension table 42 for the dimension "product," FIG. 4C illustrates a measure table 44, FIG. 4D illustrates an extended measure table 46 based on the measure table 44, FIG. 4E illustrates a sorted and extended measure table 48, and FIG. 4F illustrates a measure tree object 49.

In the third embodiment, the storage unit 11 is stored with the dimension tables 40, 42 and the measure table 44.

The dimension table 40 is defined with a key attribute (i.e. "channel.store") and two descriptive attributes (i.e. "channel.city" and "channel.area"). It is noted that the key attribute "channel.store" is the key of the dimension table 40. The dimension table 40 comprises four members, and each of the four members comprises a key value corresponding to the key attribute (i.e. "channel.store"), a descriptive value corresponding to the descriptive attribute "channel.city," and another descriptive value corresponding to the descriptive attribute "channel.area."

The dimension table 42 is defined with a key attribute (i.e. "product.sku") and two descriptive attributes (i.e. "product.category" and "product.subcategory"). The key attribute "product.sku" is the key of the dimension table 42. The dimension table 42 comprises four members, and each of the four members comprises a key value corresponding to the key attribute (i.e. "product.sku"), a descriptive value corresponding to the descriptive attribute "product.category," and another descriptive value corresponding to the descriptive attribute "product.subcategory."

The measure table 44 is defined with the key attribute "product.sku," the key attribute "channel.store," a first data field (i.e. "week 1"), and a second data field (i.e. "week 2"). Moreover, the measure table 44 comprises 8 measures, each measure comprises a first value corresponding to the key attribute "product.sku," a second value corresponding to the key attribute "channel.store," a first piece of data corresponding to the first data field "week 1," and a second piece of data corresponding to the second data field "week 2."

The user has the knowledge of both the dimension tables 40, 42 and the measure table 44; hence, the level order of N attributes inputted by the user may comprise the attributes therefrom. In the following descriptions of this embodiment, it is assumed that the level order of N attributes inputted by the user begins from "channel.city," "channel.store," "product.subcategory," and ends at "product.sku."

After the interface 13 receives the level order of the four attributes, the processor 15 determines that the measure table 20 is not defined with the descriptive attributes "channel.city" and "product.subcategory." Therefore, the processor 15 extends the measure table 44 by applying the TransJoin operation. When applying the TransJoin operation, the processor 15 creates a temporary measure table by joining the measure table 44 and the dimension table 40 with reference to the level order, particularly, with reference to "channel.city" and "channel.store." Then, the processor 15 creates the extended measure table 46 by joining the temporary measure table and the dimension table 42 with reference to the level order, particularly, with reference to "product. subcategory" and "product.sku."

Before creating a measure tree object, the processor 15 further sorts the extended measure table 46 in an attribute-by-attribute manner by following the level order. That is, the processor 15 sorts the attributes "channel.city," "channel.store," "product.subcategory," and "product.sku" of the extended measure table 46 in sequence, which results in the sorted and extended measure table 48 as shown in FIG. 4E.

After having the sorted and extended measure table 48, the processor 15 creates the measure tree object 49 as shown in FIG. 4F for the measure table by following the level order given by the user in a way that the measure tree object 49 has four levels corresponding to the four attributes in a one-to-one fashion. After the measure tree object 49 has been created, the data originally stored in the measure table 44 can be easily queried via a view path, such as "/Taipei/store 1/bakery/*."

In this embodiment, the dimension tables 40, 42 and the measure table 44 are pre-processed before being stored in the storage unit 11 in order to reduce the storage consumption. Specifically, the processor 15 adopts a one-to-one conversion equation to convert the key values and the descriptive values of the dimension tables 40, 42 and the first values and the second values of the measure table 44 into a format having the same size. For example, the one-to-one conversion equation may covert each different value into a different integer. After the key values, the descriptive values, the first values, and the second values have been converted into the format having the same size, they can be stored in a compact manner.

In addition, since the key values, the descriptive values, the first values, and the second values are converted into a format having the same size, the aforementioned TransJoin operation and sort operation can be applied to these converted values to achieve better performance.

When the user need to view the content of the dimension tables 40, 42 and the measure table 44, the processor 15 then adopts the aforementioned one-to-one conversion equation to individually convert the key values, the descriptive values, the first values, and the second values from the transmuted format to their original formats, e.g. converting from integers to their original formats.

In this embodiment, the processor 15 is able to generate another measure table from the measure tree object 49. To achieve that, the processor 15 enumerates a plurality of paths of the measure tree object, wherein each path is described by XPath. An example of the paths of the measure tree object 49 is "/Kaoshung/store 3/beverage/product 1." After deriving the paths, the processor 15 generates another measure table from the measure tree object with reference to the paths.

The processor 15 is able to generate another measure table from a sub-tree object of the measure tree object 49. To achieve that, the processor 15 enumerates a plurality of paths of the sub-tree object of the measure tree object 49, wherein each path may be described by XPath. For example, if the sub-tree object of the measure tree object 49 is rooted at "store 1," then an example of the path is "/bakery/product 2." After deriving the paths, the processor 15 generates another measure table from the sub-tree object with reference to the paths.

According to the above descriptions, it is learned that the measure table 44 is defined with only the key attributes (i.e. "channel.store" and "product.sku") in addition to the data fields (i.e. "week 1" and "wee 2"). Only when the user requires other attribute information does the measure table 44 being extended according to the level order of N attributes inputted by the user. Hence, the measure table 44 is stored in a compact manner. In the third embodiment, the dimension tables 40, 42 and the measure table 44 are further condensed by converting their content into a format having the same size. As the content of the dimension tables 40, 42 and the measure table 44 having the same size, they can be easily retrieved and operated. Moreover, the measure table and the measure tree object can be converted back and forth based on different conditions, which provides more flexibility in processing the large-scale data.

Figure 5:
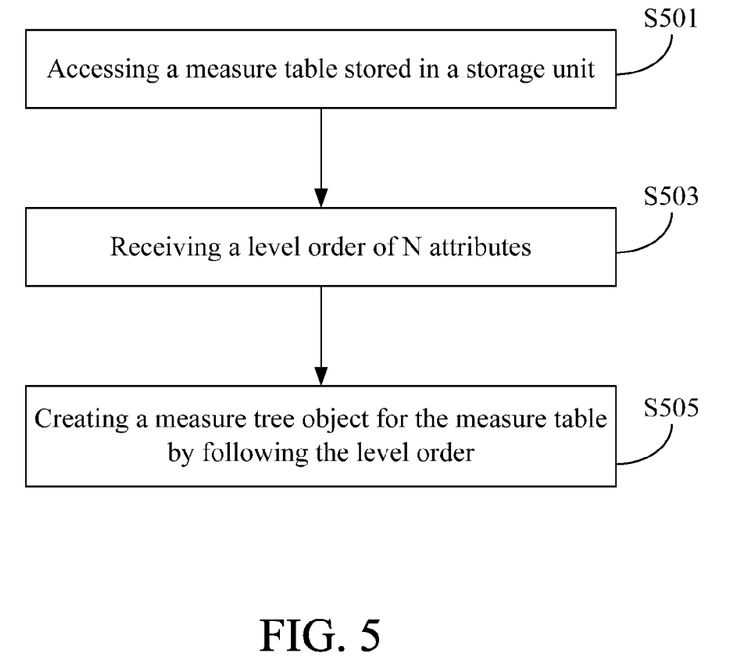
FIG. 5 illustrates a flowchart of a fourth embodiment of the present invention.

A fourth embodiment of the present invention is a large-scale data processing method, whose flowchart is illustrated in FIG. 5. The large-scale data processing method is for use in an electronic apparatus, such as the large-scale data processing apparatus 1 in the previous embodiments.

First, the large-scale data processing method executes step S501 to access a measure table stored in a storage unit. It is noted that the measure table comprises at least one measure, each of the at least one measure comprises a value corresponding to a key attribute and a piece of data corresponding to a data field.

Then, step S503 is executed to receive a level order of N attributes, wherein N is a positive integer and the N attributes comprise the first key attribute. Finally, step S505 is executed to create a measure tree object for the measure table by following the level order so that the measure tree object has N levels corresponding to the N attributes in a one-to-one fashion.

In addition to the aforesaid steps, the fourth embodiment can also execute all the operations and functions set forth in the first embodiment. How the fourth embodiment executes these operations and functions will be readily appreciated by those of ordinary skill in the art based on the explanation of the first embodiment, and thus will not be further described herein.

Figure 6:
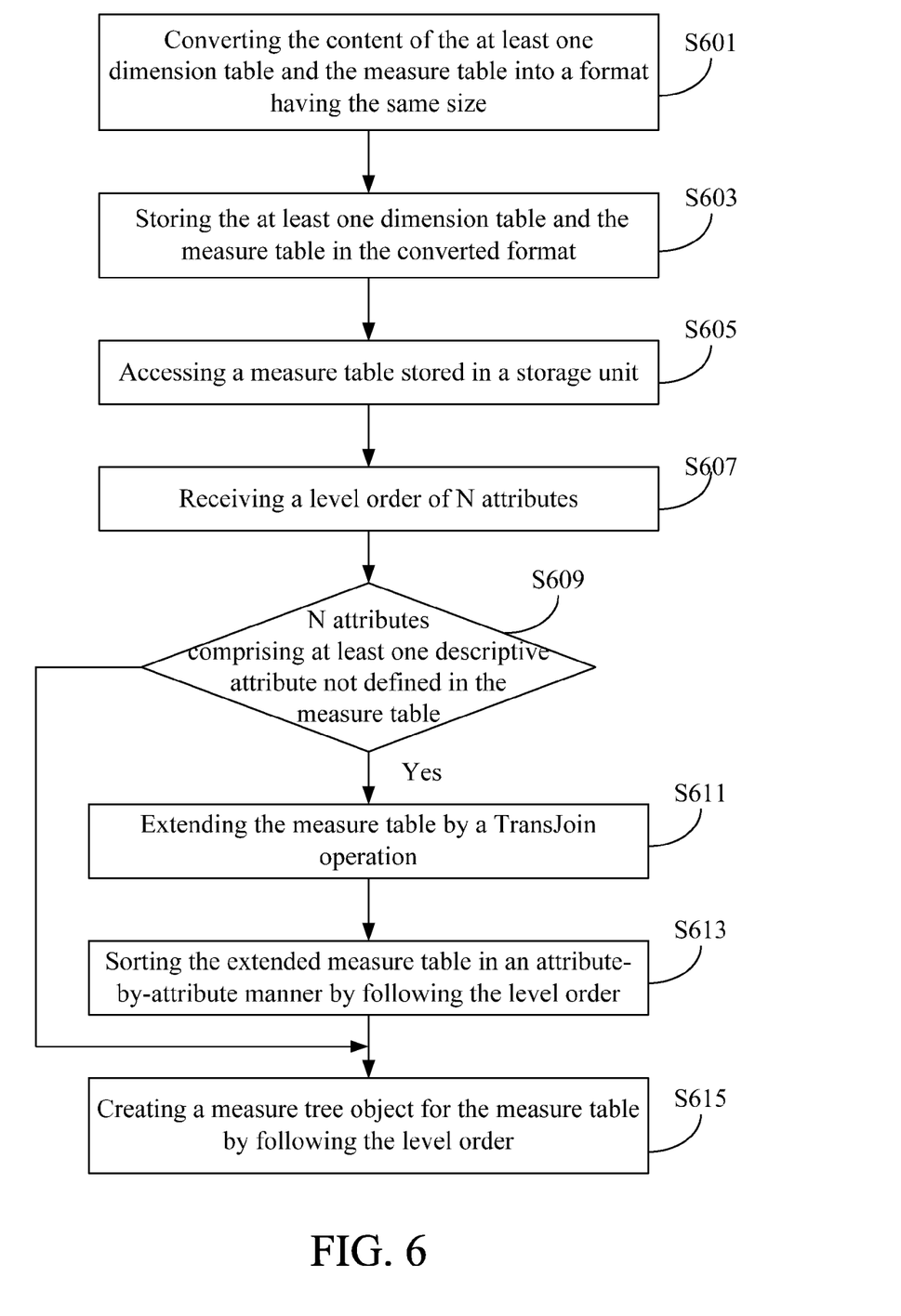
FIG. 6 illustrates a flowchart of a fifth embodiment of the present invention.

A fifth embodiment of the present invention is a large-scale data processing method, whose flowchart is illustrated in FIG. 6. The large-scale data processing method is for use in an electronic apparatus, such as the large-scale data processing apparatus 1 in the previous embodiments.

First, step S601 is execute to converting the content of the at least one dimension table and the measure table into a format having the same size. Specifically, each dimension table is defined with at least one key attribute and at least one descriptive attribute and comprises at least one member. Each of the at least one member comprises a key value corresponding to the key attribute and a descriptive value corresponding to the descriptive attribute. The measure table comprises at least one measure, each of the at least one measure comprising a value corresponding to the key attribute of at least one dimension table and a piece of data corresponding to a data field. It is noted that each value of the measure table is equivalent to one of the at least one key value of the at least one dimension table.

With the knowledge of the content of the dimension table and the measure table, the step S601 is specified to adopt a one-to-one conversion equation to individually convert the key values and the descriptive values of the dimension table and the values of the measure table into a format having the same size. Then, step S603 is executed to store the at least one dimension table and the measure table in the converted format in a storage unit.

Afterwards, step S605 is executed to access the measure table stored in the storage unit and step S607 is then executed to receive a level order of N attributes, wherein N is a positive integer and the N attributes comprise the key attribute. Step S609 is then executed to determine whether the N attributes comprises at least one descriptive attribute not defined in the measure table.

If it is yes in step S609, then step S611 is executed to extend the measure table by a TransJoin operation. The TransJoin operation joins the measure table and the dimension table that has the undefined descriptive attribute with reference to the level order. Afterwards, step S613 is executed to sort the extended measure table in an attribute-by-attribute manner by following the level order. The large-scale data processing method then executes step S615 to create a measure tree object for the measure table by following the level order, wherein the creation of the measure tree object is based on the sorted and extended measure table. If it is no in step S609, the step S615 is executed to create a measure tree object, wherein the creation of the measure tree object is based on the original measure table.

After the creation of the measure tree object, the large-scale data processing method provides various operations for user to process the measure tree object.

For example, if the user needs to view the at least one dimension table or the measure table, the large-scale data processing method adopts the one-to-one conversion equation to individually convert the content the at least one dimension table or the measure table back to their original format so that the user is able to learn the content of the at least one dimension table or the measure table.

Yet as another example, the large-scale data processing method can also generates another measure table from the measure tree object or a sub-tree object of the measure tree object. Specifically, the large-scale data processing method will enumerate a plurality of paths of the measure tree object or the sub-tree object of the measure tree object, wherein each path is described by XPath. Afterwards, the large-scale data processing method generates another measure table from the sub-tree object with reference to the paths.

In addition to the aforesaid steps, the fifth embodiment can also execute all the operations and functions set forth in the first, second, and third embodiments. How the fifth embodiment executes these operations and functions will be readily appreciated by those of ordinary skill in the art based on the explanation of the first, second, and third embodiments, and thus will not be further described herein.

The large-scale data processing methods in the fourth and fifth embodiments may be implemented as a computer program. When the computer program is loaded into an electronic apparatus, a plurality of codes comprised in the computer program are able to perform the large-scale data processing methods in the fourth and fifth embodiments. This computer program may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the measure table of the present invention is defined with only at least one key attribute in addition to the data fields. When the user intends to operate the measure table from the viewpoint of N attributes, a level order of N attributes is inputted and the measure table may be extended by the TransJoin operation. Thereafter, the present invention creates a measure tree object for the measure table by following the level order so that the measure tree object has N levels corresponding to the N attributes in a one-to-one fashion. In this way, the information can be easily queried and retrieved via a view path. In addition, the dimension tables and the measure table can be condensed by converting their content into a format having the same size. As the content of the dimension tables and the measure table having the same size, they can be easily retrieved and operated.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A large-scale data processing apparatus, comprising:
   a storage unit, being stored with a first measure table comprising at least one measure, each of the at least one measure comprising a first value corresponding to a first key attribute and a piece of data corresponding to a data field;
   an interface, being configured to receive a level order of N attributes, wherein N is a positive integer and the N attributes comprise the first key attribute; and
   a processor, being electrically connected to the storage unit and the interface and configured to create a measure tree object for the first measure table by following the level order so that the measure tree object has N levels corresponding to the N attributes in a one-to-one fashion.

2. The large-scale data processing apparatus of claim 1, wherein the storage unit is further stored with a first dimension table, the first dimension table is defined with at least the first key attribute and a first descriptive attribute and comprises at least one first member, and each of the at least one first member comprises a first key value corresponding to the first key attribute and a first descriptive value corresponding to the first descriptive attribute, wherein each first value of the first measure table is equivalent to one of the at least one first key value of the first dimension table.

3. The large-scale data processing apparatus of claim 2, wherein the N attributes further comprise the first descriptive value, the processor is further configured to extend the first measure table by a TransJoin operation, the TransJoin operation joins the first measure table and the first dimension table with reference to the level order, so that each of the at least one measure further comprises a second value corresponding to the first descriptive attribute after the TransJoin operation completes, wherein each second value is equivalent to one of the at least one first descriptive value and the measure tree object is created by the extended first measure table regarding to the TransJoin operation.

4. The large-scale data processing apparatus of claim 3, wherein the processor further sorts the extended first measure table in an attribute-by-attribute manner by following the level order before creating the measure tree object, wherein the creation of the measure tree object is based on the sorted and extended first measure table.

5. The large-scale data processing apparatus of claim 2, wherein the processor further adopts a one-to-one conversion equation to individually convert the first value, the first key value, and the first descriptive value into a transmuted format having the same size before storing the first measure table and the first dimension table in the storage unit.

6. The large-scale data processing apparatus of claim 5, wherein the processor further adopts the one-to-one conversion equation to individually convert the first value, the first key value, and the first descriptive value from the transmuted format to their original formats.

7. The large-scale data processing apparatus of claim 2, wherein each of the at least one measure further comprises a second value corresponding to a second key attribute, the storage unit is further stored with a second dimension table, the second dimension table is defined with at least the second key attribute and a second descriptive attribute and comprises at least one second member, each of the at least one second member comprises a second key value corresponding to the second key attribute and a second descriptive value corresponding to the second descriptive attribute, each second value of the first measure table is equivalent to one of the at least one second key value of the second dimension table, and the N attributes further comprise the second key attribute.

8. The large-scale data processing apparatus of claim 1, wherein the processor is further configured to enumerate a plurality of paths of the measure tree object, each path is described by XPath, and the processor is further configured to generate a second measure table from the measure tree object with reference to the paths.

9. The large-scale data processing apparatus of claim 1, wherein the processor is further configured to enumerate a plurality of paths of a sub-tree object of the measure tree object, each path is described by XPath, and the processor is further configured to generate a second measure table from the sub-tree object with reference to the paths.

10. A large-scale data processing method for use in an electronic apparatus, comprising the following steps of:
    accessing a first measure table stored in a storage unit, the first measure table comprising at least one measure, each of the at least one measure comprising a first value corresponding to a first key attribute and a piece of data corresponding to a data field;
    receiving a level order of N attributes, wherein N is a positive integer and the N attributes comprise the first key attribute; and
    creating a measure tree object for the first measure table by following the level order so that the measure tree object has N levels corresponding to the N attributes in a one-to-one fashion.

11. The large-scale data processing method of claim 10, further comprising the following step of:
    accessing a first dimension table stored in the storage unit, wherein the first dimension table is defined with at least the first key attribute and a first descriptive attribute and comprises at least one first member, and each of the at least one member comprises a first key value corresponding to the first key attribute and a first descriptive value corresponding to the first descriptive attribute, wherein each first value of the first measure table is equivalent to one of the at least one first key value of the first dimension table.

12. The large-scale data processing method of claim 11, wherein the N attributes further comprise the first descriptive value and the large-scale data processing method further comprises the step of:

extending the first measure table by a TransJoin operation, wherein the TransJoin operation joins the first measure table and the first dimension table with reference to the level order, so that each of the at least one measure further comprises a second value corresponding to the first descriptive attribute after the TransJoin operation completes, each second value is equivalent to one of the at least one first descriptive value, wherein the measure tree object is created after the first measure table is extended by the TransJoin operation.

13. The large-scale data processing method of claim 12, further comprising the following step of:

sorting the extended first measure table in an attribute-by-attribute manner by following the level order before creating the measure tree object, wherein the step of creating the measure tree object is based on the sorted and extended first measure table.

14. The large-scale data processing method of claim 11, further comprising the following step of:

adopting a one-to-one conversion equation to individually convert the first value, the first key value, and the first descriptive value into a transmuted format having the same size, wherein the first measure table and the first dimension table are stored in the storage unit after being converted.

15. The large-scale data processing method of claim 14, further comprising the following step of:

adopting the one-to-one conversion equation to individually convert the first value, the first key value, and the first descriptive value from the transmuted format to their original formats.

16. The large-scale data processing apparatus of claim 11, wherein each of the at least one measure further comprises a second value corresponding to a second key attribute, the method further comprises the step of:

accessing a second dimension table stored in the storage unit, wherein the second dimension table is defined with at least the second key attribute and a second descriptive attribute and comprises at least one second member, each of the at least one second member comprises a second key value corresponding to the second key attribute and a second descriptive value corresponding to the second descriptive attribute, each second value of the first measure table is equivalent to one of the at least one second key value of the second dimension table, and the N attributes further comprise the second key attribute.

17. The large-scale data processing method of claim 10, further comprising the following steps of:

enumerating a plurality of paths of the measure tree object, each path being described by XPath; and generating a second measure table from the measure tree object with reference to the paths.

18. The large-scale data processing method of claim 10, further comprising the following steps of:

enumerating a plurality of paths of a sub-tree object of the measure tree object, each path being described by XPath; and generating a second measure table from the sub-tree object with reference to the paths.

19. A non-transitory tangible machine-readable medium, being stored with a computer program, the computer program comprising a plurality of codes, the codes being able to execute a large-scale data processing method when the computer program is loaded into an electronic apparatus, the codes comprising:

code A for accessing a measure table stored in a storage unit, the measure table comprising at least one measure, each of the at least one measure comprising a value corresponding to a key attribute and a piece of data corresponding to a data field;

code B for receiving a level order of N attributes, wherein N is a positive integer and the N attributes comprise the key attribute;

code C for creating a measure tree object for the measure table by following the level order so that the measure tree object has N levels corresponding to the N attributes in a one-to-one fashion.

* * * * *